United States Patent
Wu

(10) Patent No.: US 9,918,455 B2
(45) Date of Patent: Mar. 20, 2018

(54) SPARROW STOP POULTRY FEEDER

(71) Applicant: Chiou Yeong Wu, Rowland Heights, CA (US)

(72) Inventor: Chiou Yeong Wu, Rowland Heights, CA (US)

( * ) Notice: Subject to any disclaimer, the term of this patent is extended or adjusted under 35 U.S.C. 154(b) by 192 days.

(21) Appl. No.: 14/831,836

(22) Filed: Aug. 20, 2015

(65) Prior Publication Data

US 2017/0049080 A1    Feb. 23, 2017

(51) Int. Cl.
*A01K 39/01* (2006.01)

(52) U.S. Cl.
CPC .................. *A01K 39/0113* (2013.01)

(58) Field of Classification Search
CPC .... A01K 39/00; A01K 39/01; A01K 39/0113; A01K 39/014; B65D 25/10; B65D 25/20; B65D 2517/0022; B65D 2517/0023
See application file for complete search history.

(56) References Cited

U.S. PATENT DOCUMENTS

| | | | | |
|---|---|---|---|---|
| 2,507,264 A * | 5/1950 | Otto | .................. | A01K 5/025 119/52.4 |
| 2,589,427 A * | 3/1952 | Ossmann | ............... | A01K 5/015 119/62 |
| 2,965,070 A * | 12/1960 | Myrick | .............. | A01K 39/0113 119/57.9 |
| 3,179,314 A * | 4/1965 | Hodgson | ................ | B65D 5/723 220/345.4 |
| 3,602,195 A * | 8/1971 | Blough | .................. | A01K 19/00 119/475 |
| 4,541,362 A * | 9/1985 | Dehls | ................. | A01K 39/0113 119/57.9 |
| 5,921,201 A * | 7/1999 | Green | ................ | A01K 39/0113 119/429 |
| 5,947,054 A * | 9/1999 | Liethen | .............. | A01K 39/0113 119/52.3 |
| 6,578,518 B1 * | 6/2003 | Conforti | ............ | A01K 39/0113 119/52.3 |
| 6,863,024 B1 * | 3/2005 | Obenshain | ........... | A01K 39/012 119/51.01 |
| 7,093,561 B2 * | 8/2006 | Rich | ..................... | A01K 39/012 119/57.8 |
| 7,261,056 B2 * | 8/2007 | Hunter | ................. | A01K 39/012 119/52.2 |
| 8,651,054 B2 * | 2/2014 | Colvin | ................. | A01K 39/012 119/52.2 |
| 9,414,574 B2 * | 8/2016 | Hoysak | .............. | A01K 39/0113 |
| 2013/0299523 A1 * | 11/2013 | Fisher | .................. | B65D 90/585 222/502 |

FOREIGN PATENT DOCUMENTS

DE        2442871 A1 *    3/1976    ............ A01K 39/00

* cited by examiner

Primary Examiner — Kathleen I Alker

(57) ABSTRACT

A poultry feeder that prevents sparrows or light-weighted birds from entering the feeding area is designed. The kernel of the poultry feeder is a feeding module or device that can be inserted into a wide variety of empty containers such as empty 5-gallon paint buckets, plastic containers, or card board boxes. The design may include a DIY (Do-It-Yourself) step for allowing a user to fit a plurality of feeding modules into a user-provided container.

4 Claims, 2 Drawing Sheets

SPARROW STOP POULTRY FEEDER

BACKGROUND OF THE INVENTION

1. Field of Invention

This application generally relates to a method of making a poultry feeder that stops sparrows or other light-weight birds from eating poultry food from the feeder. Specifically, the poultry feeder is designed to selectively preventing unintended animals from accessing the poultry feeder.

2. Background

Raising poultries in residential homes has become rather popular. Most of the current poultry feeders are designed for enclosed environment that is free of other birds like sparrows. For private poultry raisers, it is costly to build enclosed cages for their poultries to roam freely in an open area, feeding on grass and/or insects. There are five types of poultry feeders available on the market: troughs, treadle feeder, plastic feeder, grit hoppers, and pheasant feeder. Troughs and plastic feeder are designed to be used in enclosed space free of nature elements and pests. They are not suitable for outdoor poultries. While treadle feeder, grip hoppers and pheasant feeder can be used outdoors, they are either too expensive or require a learning period for chickens to get use to them. They may be rodent-proof, but not for stopping birds such as sparrows. As far as the inventor is concerned, there are no feeders available on the market designed to stop light-weighted birds such as sparrows. Thus, there is a need for designing cost-effective, sparrow-stopping poultry feeder, which will minimize the loss of feeds to unintended animals.

SUMMARY OF THE INVENTION

A poultry feeder that prevents sparrows or other light-weighted birds from entering the feeding area is designed. The kernel of the poultry feeder is a feeding module that can be inserted into a wide variety of empty containers such as empty 5-gallon paint buckets, plastic containers, or even card board boxes. The design may include a DIY (Do-It-Yourself) step for allowing a user to fit a plurality of feeding modules into a user-provided container.

DETAILED DESCRIPTION OF INVENTION

Figure 1A:
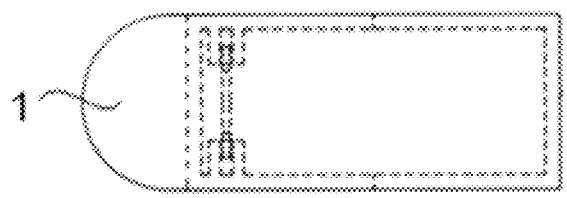
FIG. 1A illustrates top view of present invention.
Figure 1B:
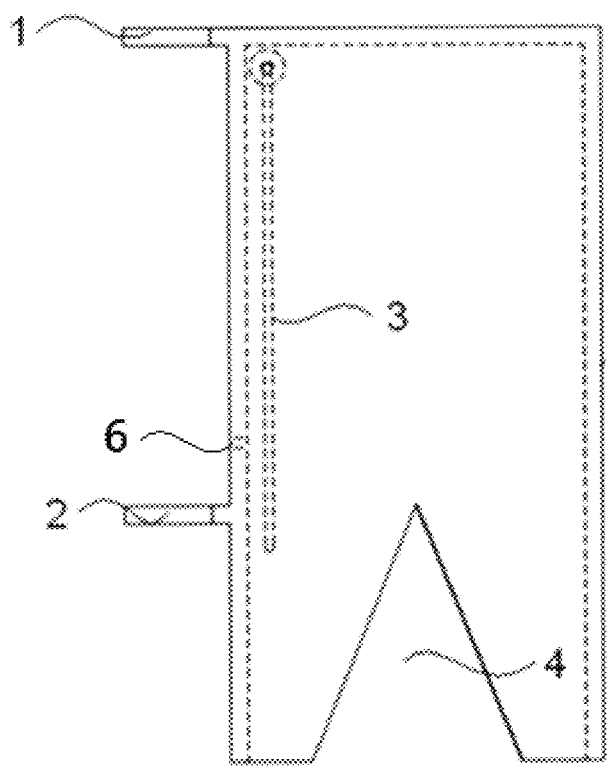
FIG. 1B illustrates side view of the present invention.
Figure 1C:
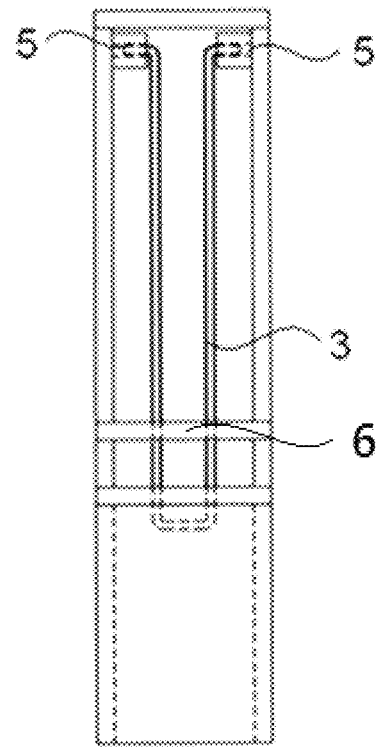
FIG. 1C illustrates front view of the present invention.

An embodiment of the present invention is a device comprising a hollow rectangular prism with a rectangular opening in the front (or front door), a triangle cut 4 on two sides of the rectangular prism, a weather guard 1, a mouse guard 2, a free-hanging U-shaped metal wire 3 resting on two wire holders 5, and a bar 6 for discouraging the sparrows from entering and getting trap inside the chamber. FIGS. 1A, 1B and 1C show the top, side, and front views, respectively, of the rectangular prism. It is noted that in order to allow a smooth flow of the poultry feeds to enter into the chamber, the height of the triangle is about the same as that of the lower edge of the rectangular front opening. In various embodiments, the width of the opening may be adjusted to only allow for one chicken or duck head to reach the void chamber; and/or the U-shaped, free-hanging wire may be replaced by a wired frame or any type of transparent or semi-transparent materials, with its weight light enough to allow a targeted poultry to push the door inward, while heavy enough to stop sparrows or other light-weighted birds from accessing the feeding region. In one embodiment, the weight of the free-hanging front door may be adjusted by any known means including, for example, adding attachable and/or adhesive materials such as magnets on the front door.

Figure 2A:
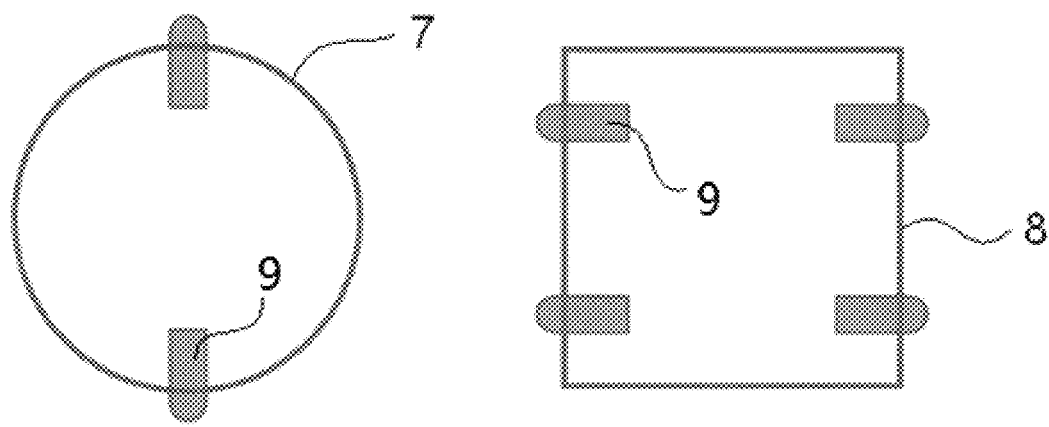
FIG. 2A illustrates top view of multiple units installed in a round or square container.
Figure 2B:
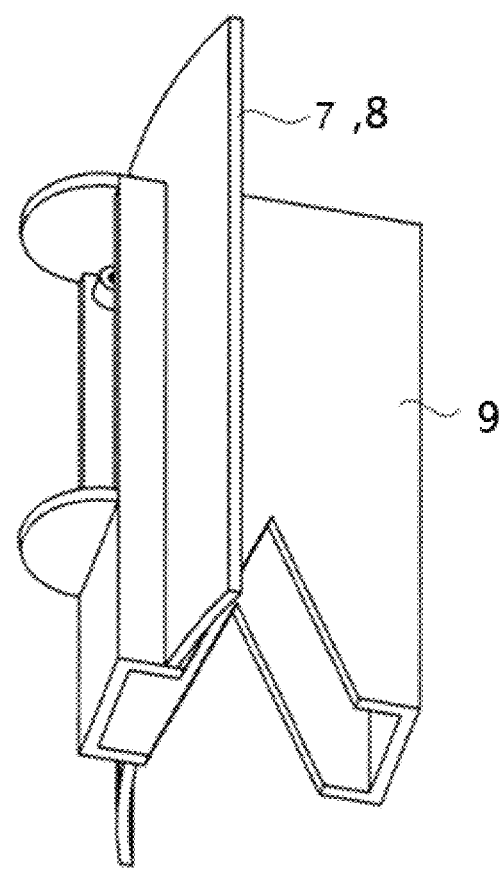
FIG. 2B illustrates perspective view of present invention installed in a bucket, wherein
  element 1 illustrates a weather guard,
  element 2 illustrates a mouse guard,
  element 3 illustrates a U shape metal wire,
  element 4 illustrates a triangle cut,
  element 5 illustrates a wire holder,
  element 6 illustrates a bar,
  element 7 illustrates a round container or bucket,
  element 8 illustrates a square container or bucket, and
  element 9 illustrates an attachable module with different shapes of the container.

FIGS. 2A and 2B each illustrates a container equipped with a plurality of the aforementioned hollow rectangular prisms. As can be seen, the number of the rectangular prisms may be further adjusted depending on the size and shape of the container. While the poultry food is generally fed through a top opening of the container, the invented rectangular prism (or compartment in general) can be adaptively added to various types of containers. For example, one may add a rain shelter on the top of the container, or choose to hang the container above the ground, and so on.

In another embodiment, the device is the rectangular prism, as shown in FIGS. 1A-1C, which is constructed as a module ready to be inserted into any type of container provided by an end user. In this embodiment, a user may purchase as many modules as needed to construct a customized poultry feeder with a wide variety of available containers. For example, one may use containers such as empty 5-gallon paint buckets, plastic containers, or card board boxes. The design would include a DIY (Do-It-Yourself) step for allowing a user to cut a number of openings, each fitting a single feeding module, on a user-provided container.

It should be understood that the foregoing related to exemplary embodiments of the invention and that modifications may be made without departing from the spirit and scope of the invention. For example, one may replace the rectangular prism with any appropriate volumetric chamber or compartment; the triangle cut may also be replaced by any appropriate hole that may allow poultry feeds to naturally flow, by gravity, into the lower portion of the chamber from the rest of the container. Thus the scope of the invention is defined solely by the appended claims.

What is claimed is:

1. A compartment module comprising:
  a front opening that opens into a hollow cavity within the compartment module;
  two opposite sidewalls defining the hollow cavity, each sidewall located on a side of the front opening and extending along the length of the front opening;
  a free-hanging front door hinged upon the two opposite sidewalls and located in the hollow cavity immediately adjacent to the front opening such that the front door is visible through the front opening;
  a bar for preventing sparrows or lightweight birds from entering and getting trapped in the compartment module and preventing the front door from swinging outward, the bar being located in the front opening;

an open bottom; and
a sizable hole in a bottom portion of each of the two opposite sidewalls for regulating poultry feeds that flow into the compartment module from a user-provided food container;
wherein the compartment module can be inserted into an opening in the user-provided food container to form a poultry feeder.

2. The compartment module of claim 1, wherein the compartment is a hollow rectangular prism and the sizable hole is a triangular cut rendered on the two opposite sides of the compartment.

3. The compartment module of claim 2, wherein the free-hanging front door is one of: a U-shaped wire, a wired frame, or a door made out of transparent or semi-transparent materials.

4. The compartment module of claim 1, wherein the weight of the front door is adjustable.

\* \* \* \* \*